United States Patent
Okimura et al.

(10) Patent No.: US 8,617,432 B2
(45) Date of Patent: Dec. 31, 2013

(54) ELECTRICALLY CONDUCTIVE OXIDE SINTERED COMPACT, THERMISTOR ELEMENT EMPLOYING THE SAME, AND TEMPERATURE SENSOR EMPLOYING THE SAME

(75) Inventors: Yasuyuki Okimura, Inuyama (JP); Shinji Ban, Gifu (JP); Hiroshi Watanbe, Komaki (JP); Takeshi Mitsuoka, Konan (JP)

(73) Assignee: NGK Spark Plug Co., Ltd., Aichi (JP)

( * ) Notice: Subject to any disclaimer, the term of this patent is extended or adjusted under 35 U.S.C. 154(b) by 274 days.

(21) Appl. No.: 13/126,625

(22) PCT Filed: Feb. 18, 2010

(86) PCT No.: PCT/JP2010/052466
§ 371 (c)(1),
(2), (4) Date: Apr. 28, 2011

(87) PCT Pub. No.: WO2010/095691
PCT Pub. Date: Aug. 26, 2010

(65) Prior Publication Data
US 2011/0220854 A1    Sep. 15, 2011

(30) Foreign Application Priority Data
Feb. 20, 2009 (JP) ................. 2009-038637

(51) Int. Cl.
*H01B 1/02* (2006.01)
(52) U.S. Cl.
USPC .............. 252/521.1; 252/519.13; 252/520.21; 252/520.4; 252/520.5; 338/25; 428/72; 501/127; 501/152; 501/153

(58) Field of Classification Search
USPC ................. 252/519.15, 520.21, 520.4, 520.5, 252/521.1; 428/702; 501/127, 152, 153; 338/25
See application file for complete search history.

(56) References Cited

U.S. PATENT DOCUMENTS

| | | | |
|---|---|---|---|
| 6,306,315 B1 | 10/2001 | Ogata et al. | |
| 2003/0027707 A1* | 2/2003 | Yamamoto et al. | 501/127 |
| 2003/0049500 A1* | 3/2003 | Takai et al. | 428/702 |
| 2003/0205698 A1 | 11/2003 | Ogata et al. | |
| 2006/0186385 A1* | 8/2006 | Chosokabe et al. | 252/521.1 |
| 2009/0016409 A1 | 1/2009 | Mizoguchi et al. | |

FOREIGN PATENT DOCUMENTS

| | | | | |
|---|---|---|---|---|
| JP | 11-251108 A | | 9/1999 | |
| JP | 2004-221519 A | | 8/2004 | |
| JP | 2007-246381 | * | 9/2007 | ............. C04B 35/00 |
| JP | 2007-246381 A | | 9/2007 | |

* cited by examiner

*Primary Examiner* — Khanh Tuan Nguyen
(74) *Attorney, Agent, or Firm* — Sughrue Mion, PLLC (57) ABSTRACT

A sintered electroconductive oxide forming a thermistor element has a first crystal phase having a composition represented by $RE1_4Al_2O_9$ and a second crystal phase having a perovskite structure represented by $(RE2_{1-a}SL_a)MO_3$. The factor a of the second crystal phase is: $0.18<a<0.50$, wherein RE1 represents at least one of Yb and Lu and at least one species selected from among group 3A elements excluding Yb, Lu, and La; RE2 represents at least one species selected from among group 3A elements excluding La and which contains at least one species selected from the group RE1; M represents Al and at least one species selected from group 4A to 7A, and 8 elements; and SL represents Sr, Ca, and Mg, with at least Sr being included at a predominant proportion by mole.

13 Claims, 7 Drawing Sheets

ELECTRICALLY CONDUCTIVE OXIDE SINTERED COMPACT, THERMISTOR ELEMENT EMPLOYING THE SAME, AND TEMPERATURE SENSOR EMPLOYING THE SAME

CROSS REFERENCE TO RELATED APPLICATIONS

This application is a National Stage of International Application No. PCT/JP2010/052466filed Feb. 18, 2011, claiming priority based on Japanese Patent Application No. 2009-038637, filed Feb. 20, 2009, the contents of all of which are incorporated herein by reference in their entirety.

TECHNICAL FIELD

The present invention relates to a sintered electroconductive oxide having electrical conductivity and changing in resistance with changes in temperature, to a thermistor element having a part formed of the sintered electroconductive oxide, and to a temperature sensor employing the thermistor element.

BACKGROUND ART

Thermistor elements and temperature sensors are employed for, for example, measuring the temperature of an exhaust gas from an internal combustion engine such as an automotive engine. In such temperature measurement, there is demand for realization of temperature sensing not only at high temperature but also at low temperature, in order to detect temperature sensor failure (wire breakage) in OBD systems (on-board diagnostic systems).

In this regard, Patent Document 1 discloses a sintered electroconductive oxide having a temperature gradient constant (B constant) of about 2,000 to about 3,000 K.

PRIOR ART DOCUMENT

Patent Document

Patent Document 1: Japanese Patent Application Laid-Open (kokai) No. 2007-246381

SUMMARY OF THE INVENTION

Problems to be Solved by the Invention

However, thermistor elements have been gradually targeted in a variety of target temperature ranges, and there is demand for a thermistor element which can be employed in a wide temperature range and which has a lower B constant.

If such a thermistor element is realized, the aforementioned temperature measurement of an exhaust gas can be correctly performed at −40° C. to +600° C. and wire breakage at low temperature and short circuit can be detected at high temperature as failures of a temperature sensor from the output data of the temperature sensor (thermistor element).

The present invention has been conceived in order to meet the aforementioned demand, and an object of the present invention is to provide a sintered electroconductive oxide which enables correct temperature sensing in a wide temperature range. Another object is to provide a thermistor element having a part formed of the sintered oxide. Yet another object is to provide a temperature sensor employing the thermistor element.

Means for Solving the Problems

In one embodiment of the present invention for attaining the aforementioned objects, there is provided a sintered electroconductive oxide characterized in that the oxide has a first crystal phase having a composition represented by $RE1_4Al_2O_9$ and a second crystal phase having a perovskite structure represented by $(RE2_{1-a}SL_a)MO_3$, and that the factor a of the second crystal phase satisfies the following condition: $0.18 < a < 0.50$, wherein RE1 represents a first element group consisting of at least one of Yb and Lu and at least one species selected from among group 3A elements excluding Yb, Lu, and La;

RE2 represents a second element group which contains at least one species selected from among group 3A elements excluding La and which contains at least one species selected from the first element group RE1;

M1 represents an element group consisting of at least one species selected from among group 4A, 5A, 6A, 7A, and 8 elements; and M represents an element group consisting of the element group M1 and Al; and SL represents an element group consisting of Sr, Ca, and Mg, with at least Sr being included at a predominant proportion by mole.

The sintered electroconductive oxide has the aforementioned first crystal phase containing the first element group RE1 and aluminum. The sintered oxide also contains the aforementioned second crystal phase having a perovskite structure whose A site element consists of the second element group RE2 and the element group SL of group 2A elements (group 2 elements) with a factor a falling within a specific range and whose B site element consists of aluminum and element group M1 including a group 4A element or the like. By virtue of the presence of the two crystal phases, the B constant of the sintered oxide can be considerably suppressed, even though the perovskite-structure second crystal phase has a large B constant. Thus, the B constant can be reduced to 2,000 K or lower, within a temperature range of, for example, −40° C. to +600° C.

Accordingly, correct temperature measurement can be performed within a wide temperature range.

The first element group RE1 consists of at least one of Yb and Lu and at least one species selected from among group 3A elements (group 3 elements) excluding Yb, Lu, and La. Examples thereof include Y and Yb, and Y and Lu.

The second element group RE2 is an element group containing at least one species selected from the element group forming the first element group RE1. Thus, when the first element group RE1 is Y and Yb, the second element group RE2 is Y exclusive, Yb exclusive, or Y and Yb. Needless to say, the first element group RE1 may be the same element group as the second element group RE2.

The presence of the first crystal phase or the second crystal phase (crystal phase having a perovskite crystal structure type) may be determined through X-ray diffraction on the basis of the presence of a characteristic peak attributed to a crystal of the same crystal system having a similar composition and the presence of elements corresponding to the crystal phase.

In the B site of the second crystal phase, the element group M1, which forms solid solution with (is substitute by) Al, is at least one species selected from among group 4A, 5A, 6A, 7A, and 8 elements (group 4 to group 10 elements). Specific examples thereof include Mn, Fe, and Cr.

In the A site of the second crystal phase, the element group SL, which forms solid solution with (is substitute by) the second element group RE2, consists of group 2A elements (group 2 elements) Sr, Ca, and Mg, with at least Sr being included at a predominant proportion by mole. Thus, the element group SL may be exclusively Sr or in a mixed state of Sr at 50 mol % or more with the balance being Ca and/or Mg.

Under certain firing conditions for producing the sintered electroconductive oxide (e.g., firing atmosphere (e.g., oxidizing or reducing) and firing temperature), or at certain element substitution proportions in the A site and the B site, the formed oxide may have oxygen excess or deficiency. In the aforementioned compositional formula, the ratio by mole of oxygen atom to the A site element, and that of oxygen atom to the B site element are not necessarily just 3:1, so long as the perovskite-type crystal structure is maintained.

The lower limit of the factor a of the second crystal phase is preferably a≥0.19. Under the conditions, the B constant (−40 to 600° C.) can be reliably adjusted to 2,000 K or less, in the presence of the first and second crystal phases. Furthermore, the lower limit of factor a is more preferably a≥0.24. In this case, the B constant (−40 to 600° C.) can reliably be adjusted to 1,950 K or less.

The element group SL of the sintered electroconductive oxide is preferably Sr.

In the A site of the second crystal phase, the element group SL, which forms solid solution with (is substituted by) the second element group RE2, may be Sr or in a mixed state of Sr as a predominant component with Ca or Mg. However, solo use of Sr is more preferred than use of Sr in combination with Ca or Mg. In the case of solo use of Sr in the formation of solid solution with (substitution by) the second element group RE2, the B constant (e.g., −40 to +600° C.) can be reduced in a wide temperature range of, for example, −40 to +600° C.

In the sintered electroconductive oxide, the aforementioned element group M1 is preferably Cr and at least Mn and Fe.

In the B site of the second crystal phase, when Mn or Fe is employed as the element group M1, which forms solid solution with (is substituted by) Al, the produced sintered oxide and the thermistor element having a part formed of the oxide reliably exhibit appropriate electrical properties (e.g., B constant and resistance) in a wide temperature range, which is advantageous. Use of Cr readily provides the sintered oxide and the thermistor element with reliable electrical properties, which is also advantageous.

Particularly preferably, in any of the aforementioned sintered electroconductive oxides, the element group M1 contains at least Mn and Cr.

In the B site of the second crystal phase, when Mn and Cr are employed as the element group M1, which forms solid solution with (is substituted by) Al, the produced sintered oxide and the thermistor element having a part formed of the oxide reliably exhibit appropriate electrical properties, which is advantageous.

Preferably, in the sintered electroconductive oxide as described in any one of the claims, the second crystal phase is represented by $(RE2_{1-a}SL_a)(Al_xM1_w)O_3$, wherein the factors x and w satisfy the following relationships:

$0.40 \leq x \leq 0.90$;

$0.05 \leq w \leq 0.65$; and $0.90 \leq x+w \leq 1.1$.

In the above embodiment of the sintered electroconductive oxide, the second crystal phase having a perovskite structure ($ABO_3$ structure) contains a B-site element group M of Al and the element group M1. In the B site, factors x and w, which represent the ratio by mole of Al and the element group M1, are adjusted to the aforementioned relationships.

Through incorporation of the element group M1 into the B site, the perovskite-structure second crystal phase can be readily formed and maintained, whereby the produced sintered oxide reliably serves as a conductor.

More preferably, in the sintered electroconductive oxide as described in any one of the claims, the element group M1 contains Mn and Cr, and the second crystal phase is represented by $(RE2_{1-a}SL_a)(Al_xMn_yCr_z)O_3$, wherein the factors x, y, and z satisfy the following relationships:

$0.40 \leq x \leq 0.90$;

$0.05 \leq y \leq 0.60$;

$0 < z \leq 0.05$; and $0.90 \leq x+y+z \leq 1.1$.

In the above embodiment of the sintered electroconductive oxide, the second crystal phase having a perovskite structure ($ABO_3$ structure) contains a B-site element group M including Al, Mn, and Cr. In the B site, factors x, y, and z, which represent the proportions by mole of these elements, are adjusted to the aforementioned relationships. Since the ionic radii of the elements Al, Mn, and Cr included in the B site are almost the same, these elements are readily replaceable. Therefore, formation of by-products of these elements is prevented, and the produced oxide has stable substitution proportions. By virtue of this property, the resistivity and the temperature gradient constant (B constant) of the sintered electroconductive oxide can be modified through changing the compositional proportions as desired in a wide range.

In another embodiment, the sintered electroconductive oxide has a first crystal phase having a composition represented by $RE1_4Al_2O_9$ and a second crystal phase having a perovskite structure represented by $(RE2_{1-a}Sr_a)MO_3$, and the factor a of the second crystal phase satisfies the following condition: $0.18 < a < 0.50$, wherein RE1 represents a first element group consisting of at least one of Yb and Lu and at least one species selected from among group 3A elements excluding Yb, Lu, and La;

RE2 represents a second element group which contains at least one species selected from among group 3A elements excluding La and which contains at least one species selected from the first element group RE1; and M represents an element group consisting of Al and at least one species selected from among group 4A, 5A, 6A, 7A, and 8 elements.

The sintered electroconductive oxide has the aforementioned first crystal phase and the aforementioned second crystal phase having a factor a falling within a specific range. By virtue of the presence of the two crystal phases, the B constant of the sintered oxide can be considerably suppressed. Thus, the B constant can be reduced to 2,000 K or lower, within a temperature range of, for example, −40° C. to +600° C.

Accordingly, correct temperature measurement can be performed within a wide temperature range.

The lower limit of the factor a of the second crystal phase is preferably a≥0.19. Under the conditions, the B constant (−40 to 600° C.) can be reliably adjusted to 2,000 K or less, in the presence of the first and second crystal phases. Furthermore, the lower limit of factor a is more preferably a≥0.24. In this case, the B constant (−40 to 600° C.) can reliably be adjusted to 1,950 K or less.

More preferably, in the sintered electroconductive oxide, the element group M contains Al, Mn, and Cr, and the second crystal phase is represented by $(RE2_{1-a}Sr_a)(Al_xMn_yCr_z)O_3$, wherein the factors x, y, and z satisfy the following relationships:

$0.40 \leq x \leq 0.90$;

$0.05 \leq y \leq 0.60$;

$0 < z \leq 0.05$; and $0.90 \leq x+y+z \leq 1.1$.

In the above embodiment of the sintered electroconductive oxide, the second crystal phase having a perovskite structure ($ABO_3$ structure) contains a B-site element group M including Al, Mn, and Cr. In the B site, factors x, y, and z, which represent the proportions by mole of these elements, are adjusted to the aforementioned relationships. Since the ionic radii of the elements Al, Mn, and Cr included in the B site are almost the same, these elements are readily replaceable. Therefore, formation of by-products of these elements is prevented, and the produced oxide has a stable substitution proportions. By virtue of this property, the resistivity and the temperature gradient constant (B constant) of the sintered electroconductive oxide can be modified through changing the compositional proportions as desired in a wide range.

Under certain firing conditions for producing the sintered electroconductive oxide (e.g., firing atmosphere (e.g., oxidizing or reducing) and firing temperature), or at certain element substitution proportions in the A site and the B site, the formed oxide may have oxygen excess or deficiency. In the aforementioned compositional formula, the ratio by mole of oxygen atom to $(RE2_{1-a}Sr_a)$, and that of oxygen atom to $(Al_xMn_yCr_z)$ are not necessarily just 3:1, so long as the perovskite-type crystal structure is maintained.

When x, y, and z satisfy the following conditions, the aforementioned effects are more satisfactorily attained, which is advantageous.

$0.65 \leq x \leq 0.85$;

$0.15 \leq y \leq 0.35$;

$0 < z \leq 0.03$; and $0.95 \leq x+y+z \leq 1.05$

In a preferred embodiment, there is provided a thermistor element having a part formed of any of the aforementioned sintered electroconductive oxides.

Through employment of any of the aforementioned sintered electroconductive oxides, the thermistor element has an appropriate temperature gradient constant which enables temperature measurement in a wide temperature range of, for example, −40 to +600° C.

Thus, when the aforementioned temperature sensor for measuring the temperature of exhaust gas is fabricated by use of the thermistor element, detection of wire breakage at low temperature and short circuit at high temperature can be correctly performed from the output data of the temperature sensor.

In an alternative embodiment, there is provided a thermistor element comprising a sintered compact of any of the aforementioned sintered electroconductive oxides, and a reduction-resistant coating film which covers the sintered electroconductive oxide compact.

This thermistor element has a sintered compact of electroconductive oxide and a reduction-resistant coating film which covers the sintered compact. Therefore, even when the thermistor element is exposed to a reducing atmosphere, the sintered compact is protected by the reduction-resistant coating film, to thereby prevent reduction of the compact. As a result, the electrical resistance and B constant of the thermistor element (sintered compact) can be maintained.

In a preferred embodiment, there is provided a temperature sensor employing any of the aforementioned thermistor elements.

Through employment of the thermistor element produced from the aforementioned sintered electroconductive oxide, the temperature sensor enables temperature measurement in a wide temperature range of, for example, −40 to +600° C.

Thus, when the aforementioned temperature sensor for measuring the temperature of exhaust gas is fabricated by use of the thermistor element, detection of wire breakage at low temperature and short circuit at high temperature can be correctly performed from the output data of the employed thermistor element.

MODES FOR CARRYING OUT THE INVENTION

Examples of a thermistor element 2 having a part formed of a sintered electroconductive oxide 1 falling within the scope of the present invention will be described with Comparative Examples thereof.

EXAMPLES 1 TO 16

There will next be described the production of a sintered electroconductive oxide 1 and a thermistor element 2 according to Examples 1 to 16 and Comparative Examples 1 to 6. $Y_2O_3$, $Nd_2O_3$, $Yb_2O_3$, $Lu_2O_3$, $SrCO_3$ (as reduced to SrO in Table 1), $CaCO_3$ (as reduced to CaO in Table 1), MgO, $Al_2O_3$, $MnO_2$, $Fe_2O_3$, and $Cr_2O_3$ in the powder form (all commercial products (purity: ≥99%)) were used as raw materials. In each case, the corresponding materials were weighed so as to attain the raw material composition (mol %) shown in Table 1, and the powder materials were wet-mixed and then dried, to thereby prepare a raw material powder mixture. The mixture was then calcined in air at 1,400° C. for 2 hours, to thereby form a calcined powder having a mean particle size of 1 to 2 μm. The powder was mixed and pulverized by means of a resin pot and high-purity alumina grinding balls, with ethanol serving as a dispersion medium.

TABLE 1

| | Raw material composition (mol %) | | | | | | | | | | |
|---|---|---|---|---|---|---|---|---|---|---|---|
| | Y2O3 | Nd2O3 | Yb2O3 | Lu2O3 | SrO | CaO | MgO | Al2O3 | MnO2 | Fe2O3 | Cr2O3 |
| Ex. 1 | 29.91 | — | 6.41 | — | 12.82 | — | — | 34.19 | 16.24 | — | 0.43 |
| Ex. 2 | 29.29 | — | 4.18 | — | 16.74 | — | — | 33.47 | 15.90 | — | 0.42 |
| Ex. 3 | 27.20 | — | 6.28 | — | 16.74 | — | — | 33.47 | 15.90 | — | 0.42 |
| Ex. 4 | 27.50 | — | 6.25 | — | 16.67 | — | — | 33.33 | 15.83 | — | 0.42 |
| Ex. 5 | 32.53 | — | 4.65 | — | 14.87 | — | — | 33.46 | 14.13 | — | 0.37 |
| Ex. 6 | 29.29 | — | — | 4.18 | 16.74 | — | — | 33.47 | 15.90 | — | 0.42 |
| Ex. 7 | 29.29 | — | 2.09 | 2.09 | 16.74 | — | — | 33.47 | 15.90 | — | 0.42 |
| Ex. 8 | 38.40 | — | 5.49 | — | 12.54 | — | — | 31.35 | 11.91 | — | 0.31 |
| Ex. 9 | 37.23 | — | 5.32 | — | 12.16 | — | — | 33.43 | 11.55 | — | 0.30 |
| Ex. 10 | 27.56 | — | 3.94 | — | 21.65 | — | — | 31.50 | 14.96 | — | 0.39 |
| Ex. 11 | 25.97 | — | 6.49 | — | 21.64 | — | — | 27.82 | 17.62 | — | 0.46 |
| Ex. 12 | — | 28.87 | 4.12 | — | 16.49 | — | — | 30.93 | 18.56 | — | 1.03 |
| Ex. 13 | — | 31.82 | 4.55 | — | 18.18 | — | — | 36.36 | — | 8.82 | 0.27 |
| Ex. 14 | 29.29 | — | 4.18 | — | 15.06 | 1.67 | — | 33.47 | 15.90 | — | 0.42 |
| Ex. 15 | 29.29 | — | 4.18 | — | 15.06 | — | 1.67 | 33.47 | 15.90 | — | 0.42 |
| Ex. 16 | 27.20 | — | 6.28 | — | 16.74 | — | — | 33.47 | 15.90 | — | 0.42 |
| Comp. Ex. 1 | 34.93 | — | 4.37 | — | 8.73 | — | — | 34.93 | 16.59 | — | 0.44 |
| Comp. Ex. 2 | 36.32 | — | — | — | 12.82 | — | — | 34.19 | 16.24 | — | 0.43 |
| Comp. Ex. 3 | 27.20 | — | 6.28 | — | 16.74 | — | — | 33.47 | 15.90 | — | 0.42 |
| Comp. Ex. 4 | 29.44 | — | 6.31 | — | 12.62 | — | — | 31.96 | 19.18 | — | 0.50 |
| Comp. Ex. 5 | 29.29 | — | 4.18 | — | 8.37 | 8.37 | — | 33.47 | 15.90 | — | 0.42 |
| Comp. Ex. 6 | 29.29 | — | 4.18 | — | 8.37 | — | 8.37 | 33.47 | 15.90 | — | 0.42 |

Subsequently, the thus-obtained slurry was dried at 80° C. for 2 hours, to thereby yield a thermistor synthesis powder. To the thermistor synthesis powder (100 parts by weight), a polyvinyl butyral-based binder (20 parts by weight) was added. The resultant mixture was dried and granulated through passage through a sieve (250-μm mesh), to thereby produce a granulated powder.

The binder is not particularly limited to polyvinyl butyral, and examples of the binder which may be used in the invention include polyvinyl alcohol and acrylic binders. The binder is generally used in an amount of 5 to 20 parts by weight with respect to the total amount of the calcined powder, preferably 10 to 20 parts by weight.

Before mixing with the binder, the mean particle size of the thermistor synthesis powder is preferably adjusted to 2.0 μm or less for ensuring production of a uniform mixture.

As is clear from Table 1, the mixture of Example 3 and that of Comparative Example 3 are identical to each other in composition, but different from each other in the firing temperature mentioned below.

Example 6 employs $Lu_2O_3$ instead of $Yb_2O_3$ used in Example 2. Example 7 employs equimole amounts of $Yb_2O_3$ and $Lu_2O_3$ instead of $Yb_2O_3$ used in Example 2.

Examples 12 and 13 employ $Nd_2O_3$ instead of $Yb_2O_3$. Example 13 employs $Fe_2O_3$ instead of $MnO_2$.

Example 14 employs partially (10 mol %) CaO-substituted SrO instead of SrO used in Example 2. Similarly, Example 15 employs partially (10 mol %) MgO-substituted SrO instead of SrO used in Example 2.

The mixture of Example 3 and that of Example 16 are identical to each other in composition and firing temperature. However, as described hereinbelow, the thermistor element produced in Example 16 has been fabricated by coating the fired compact of Example 3 with a reduction-resistant coating film.

Comparative Example 5 employs a composition similar to that of Example 14, except that partially (50 mol %) CaO-substituted SrO is used instead of SrO used in Example 2. Similarly, Comparative Example 6 employs a composition similar to that of Example 15, except that partially (50 mol %) MgO-substituted SrO is used instead of SrO used in EXAMPLE 2.

(X-Ray Analysis)

Each of the above-prepared granulated powders was uniaxially molded at 20 MPa to form a column (19 mmφ×2 mm). The molded product was subjected to cold isostatic pressing (CIP) at 150 MPa, and the resultant compact was fired in air at 1,550° C. for 4 hours, to thereby produce a sintered electroconductive oxide sample for X-ray analysis (Examples 1 to 16, and Comparative Examples 1, 2, 4 to 6). Separately, the procedure of Example 3 was repeated, except that the firing temperature was changed to 1,450° C., to thereby produce a sample of Comparative Example 3.

TABLE 2

| | | 1st Cryst. | 2nd Cryst. phase - perovskite cryst. phase (=$(RE2_{1-a}SL_a)MO_3$) | | | | | | | | Cryst. phases other |
|---|---|---|---|---|---|---|---|---|---|---|---|
| | | phase | A site (=$RE2_{1-a}SL_a$) | | | B site (=M=$Al_xM1_w$) | | | | | than 1st & 2nd cryst. |
| | Firing temp. | $RE1_4Al_2O_9$ | RE2 | a | SL | M | x | y | z | M1 | w | phases |
| Ex. 1 | 1,550° C. | $(Y,Yb)_4Al_2O_9$ | Y, Yb | 0.21 | Sr | $Al_xMn_yCr_z$ | 0.78 | 0.20 | 0.01 | Mn, Cr | 0.21 | $SrAl_2O_4, Yb_2O_3$ |
| Ex. 2 | 1,550° C. | $(Y,Yb)_4Al_2O_9$ | Y, Yb | 0.29 | Sr | $Al_xMn_yCr_z$ | 0.68 | 0.30 | 0.02 | Mn, Cr | 0.32 | $SrAl_2O_4, Yb_2O_3$ |
| Ex. 3 | 1,550° C. | $(Y,Yb)_4Al_2O_9$ | Y, Yb | 0.28 | Sr | $Al_xMn_yCr_z$ | 0.70 | 0.29 | 0.01 | Mn, Cr | 0.30 | $SrAl_2O_4, Yb_2O_3$ |
| Ex. 4 | 1,550° C. | $(Y,Yb)_4Al_2O_9$ | Y, Yb | 0.28 | Sr | $Al_xMn_yCr_z$ | 0.72 | 0.29 | 0.01 | Mn, Cr | 0.30 | $SrAl_2O_4, Yb_2O_3$ |
| Ex. 5 | 1,550° C. | $(Y,Yb)_4Al_2O_9$ | Y, Yb | 0.28 | Sr | $Al_xMn_yCr_z$ | 0.70 | 0.29 | 0.01 | Mn, Cr | 0.30 | $SrAl_2O_4, Yb_2O_3$ |
| Ex. 6 | 1,550° C. | $(Y,Lu)_4Al_2O_9$ | Y, Lu | 0.28 | Sr | $Al_xMn_yCr_z$ | 0.70 | 0.29 | 0.01 | Mn, Cr | 0.30 | $SrAl_2O_4, Lu_2O_3$ |
| Ex. 7 | 1,550° C. | $(Y,Yb,Lu)_4Al_2O_9$ | Y, Yb, Lu | 0.28 | Sr | $Al_xMn_yCr_z$ | 0.70 | 0.29 | 0.01 | Mn, Cr | 0.30 | $SrAl_2O_4, Lu_2O_3, Yb_2O_3$ |

TABLE 2-continued

| | Firing temp. | 1st Cryst. phase RE1$_4$Al$_2$O$_9$ | 2nd Cryst. phase - perovskite cryst. phase (=(RE2$_{1-a}$SL$_a$)MO$_3$) | | | | | | | | Cryst. phases other than 1st & 2nd cryst. phases |
|---|---|---|---|---|---|---|---|---|---|---|---|
| | | | A site (=RE2$_{1-a}$SL$_a$) | | | B site (=M=Al,M1$_w$) | | | | | |
| | | | RE2 | a | SL | M | x | y | z | M1 | w |
| Ex. 8 | 1,550° C. | (Y,Yb)$_4$Al$_2$O$_9$ | Y, Yb | 0.19 | Sr | Al$_x$Mn$_y$Cr$_z$ | 0.79 | 0.19 | 0.01 | Mn, Cr | 0.20 SrAl$_2$O$_4$, Yb$_2$O$_3$ |
| Ex. 9 | 1,550° C. | (Y,Yb)$_4$Al$_2$O$_9$ | Y, Yb | 0.24 | Sr | Al$_x$Mn$_y$Cr$_z$ | 0.65 | 0.33 | 0.01 | Mn, Cr | 0.34 SrAl$_2$O$_4$, Yb$_2$O$_3$ |
| Ex. 10 | 1,550° C. | (Y,Yb)$_4$Al$_2$O$_9$ | Y, Yb | 0.35 | Sr | Al$_x$Mn$_y$Cr$_z$ | 0.64 | 0.30 | 0.01 | Mn, Cr | 0.31 SrAl$_2$O$_4$, Yb$_2$O$_3$ |
| Ex. 11 | 1,550° C. | (Y,Yb)$_4$Al$_2$O$_9$ | Y, Yb | 0.42 | Sr | Al$_x$Mn$_y$Cr$_z$ | 0.63 | 0.35 | 0.02 | Mn, Cr | 0.37 SrAl$_2$O$_4$, Yb$_2$O$_3$ |
| Ex. 12 | 1,550° C. | (Nd,Yb)$_4$Al$_2$O$_9$ | Nd, Yb | 0.20 | Sr | Al$_x$Mn$_y$Cr$_z$ | 0.75 | 0.23 | 0.02 | Mn, Cr | 0.25 SrAl$_2$O$_4$, Yb$_2$O$_3$ |
| Ex. 13 | 1,550° C. | (Nd,Yb)$_4$Al$_2$O$_9$ | Nd, Yb | 0.24 | Sr | Al$_x$Fe$_y$Cr$_z$ | 0.75 | 0.24 | 0.01 | Fe, Cr | 0.25 SrAl$_2$O$_4$, Yb$_2$O$_3$ |
| Ex. 14 | 1,550° C. | (Y,Yb)$_4$Al$_2$O$_9$ | Y, Yb | 0.29 | Sr, Ca | Al$_x$Mn$_y$Cr$_z$ | 0.68 | 0.30 | 0.02 | Mn, Cr | 0.32 SrAl$_2$O$_4$, Yb$_2$O$_3$ |
| Ex. 15 | 1,550° C. | (Y,Yb)$_4$Al$_2$O$_9$ | Y, Yb | 0.29 | Sr, Mg | Al$_x$Mn$_y$Cr$_z$ | 0.68 | 0.30 | 0.02 | Mn, Cr | 0.32 SrAl$_2$O$_4$, Yb$_2$O$_3$ |
| Ex. 16 | 1,550° C. | (Y,Yb)$_4$Al$_2$O$_9$ | Y, Yb | 0.28 | Sr | Al$_x$Mn$_y$Cr$_z$ | 0.70 | 0.29 | 0.01 | Mn, Cr | 0.30 SrAl$_2$O$_4$, Yb$_2$O$_3$ |
| Comp. Ex. 1 | 1,550° C. | *** | Y, Yb | 0.15 | Sr | Al$_x$Mn$_y$Cr$_z$ | 0.80 | 0.19 | 0.01 | Mn, Cr | 0.20 Yb$_2$O$_3$ |
| Comp. Ex. 2 | 1,550° C. | *** | Y | 0.11 | Sr | Al$_x$Mn$_y$Cr$_z$ | 0.80 | 0.19 | 0.01 | Mn, Cr | 0.20 SrAl$_2$O$_4$, Y$_2$O$_3$ |
| Comp. Ex. 3 | 1,450° C. | *** | Y, Yb | 0.10 | Sr | Al$_x$Mn$_y$Cr$_z$ | 0.78 | 0.19 | 0.01 | Mn, Cr | 0.20 SrAl$_2$O$_4$, Yb$_2$O$_3$ |
| Comp. Ex. 4 | 1,550° C. | *** | Y, Yb | 0.17 | Sr | Al$_x$Mn$_y$Cr$_z$ | 0.78 | 0.20 | 0.01 | Mn, Cr | 0.21 SrAl$_2$O$_4$, Yb$_2$O$_3$ |
| Comp. Ex. 5 | 1,550° C. | *** | Y, Yb | 0.15 | Sr, Ca | Al$_x$Mn$_y$Cr$_z$ | 0.80 | 0.19 | 0.01 | Mn, Cr | 0.20 Yb$_2$O$_3$ |
| Comp. Ex. 6 | 1,550° C. | *** | Y, Yb | 0.10 | Sr, Mg | Al$_x$Mn$_y$Cr$_z$ | 0.80 | 0.19 | 0.01 | Mn, Cr | 0.20 SrAl$_2$O$_4$ |

After surface polishing, each sample was analyzed by means of an X-ray diffractometer, to thereby identify the formed crystal phases. Table 2 shows the results. The results of X-ray diffraction analysis of the samples of Examples 2 and 3 and Comparative Examples 1 and 3 are also shown as typical examples (see FIGS. 1 to 4).

In the X-ray diffraction charts, peaks denoted by "O" correspond to those attributed to YAlO$_3$, when the crystal structure type is assumed to YAlO$_3$. As is clear from the charts, a peak pattern intrinsic to the perovskite structure is observed. Thus, the presence of a crystal phase (second crystal phase) having a perovskite structure is confirmed in the samples of Examples 2 and 3 and Comparative Examples 1 and 3. The reason why the analysis was based on the peak data of YAlO$_3$ is as follows. Conceivably, the A site contains Y with Yb (or Lu) and Sr, and the B site contains Al with Mn and Cr. The elements other than Y and Al form solid solution at the corresponding site. Therefore, if a second crystal phase is present, an X-ray diffraction pattern similar to that of YAlO$_3$ is observed.

Through EPMA/WDS, the compositional analysis of the crystal phases including a conductive perovskite-type crystal phase (second crystal phase) was performed. Through the analysis, the perovskite-type crystal phase was found to contain Y and Al with Yb (or Lu), Sr, Mn, and Cr. Therefore, this perovskite-type crystal phase is thought to have a composition of ((Y,Yb)$_{1-a}$Sr$_a$)(Al,Mn,Cr)O$_3$, which differs from YAlO$_3$.

Figure 1:
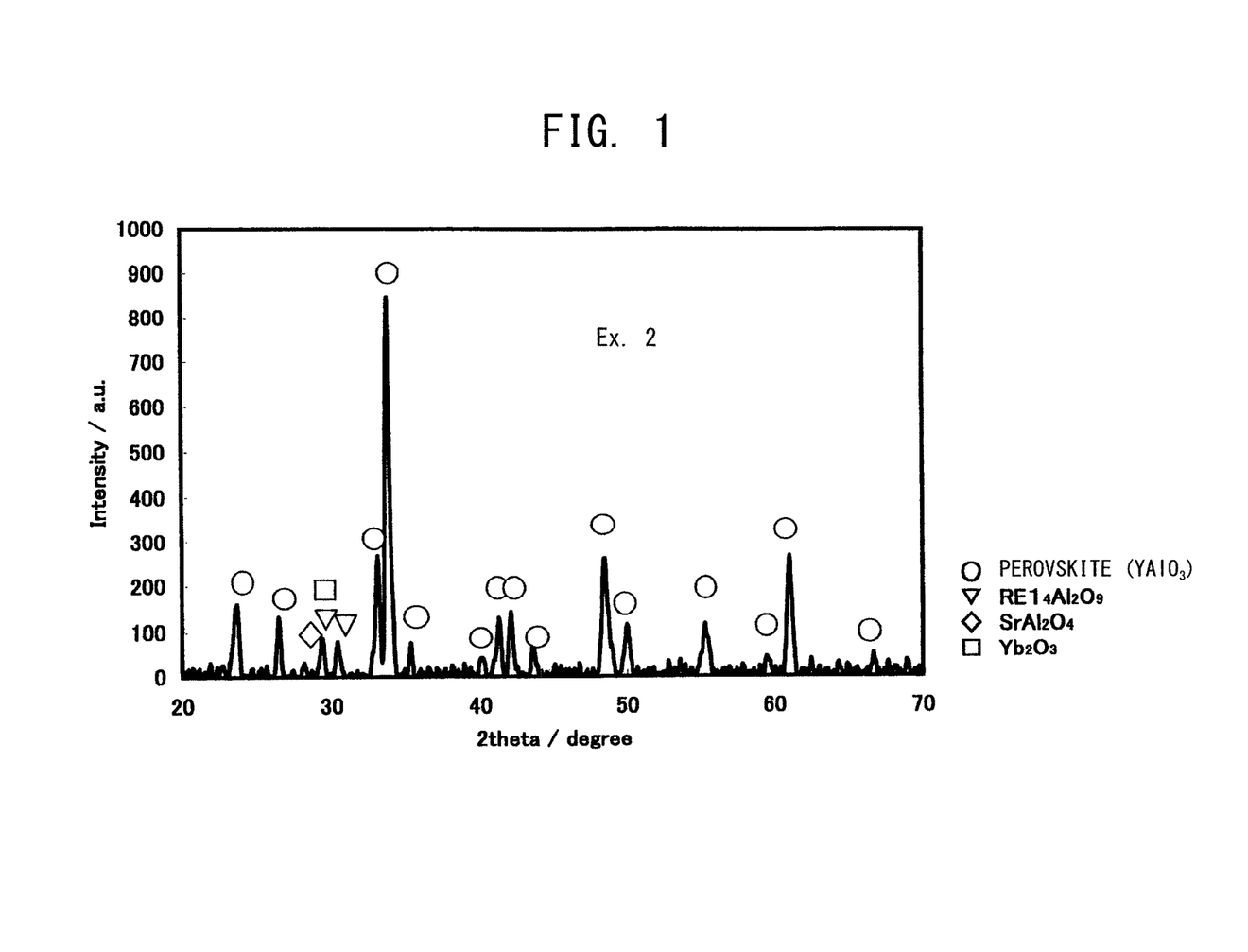
[FIG. 1] Chart showing the X-ray diffraction analysis of the sintered electroconductive oxide of Example 2.
Figure 2:
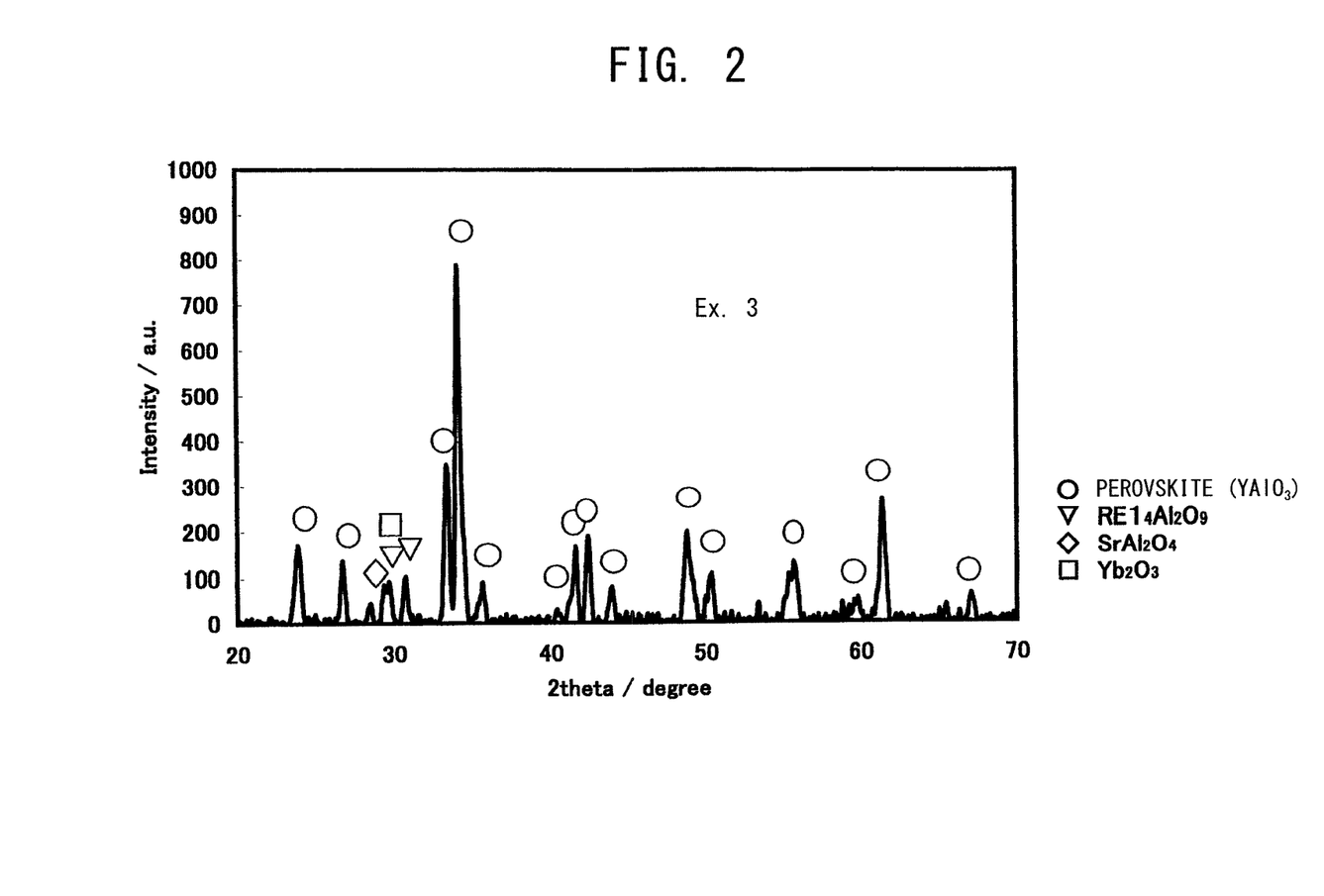
[FIG. 2] Chart showing the X-ray diffraction analysis of the sintered electroconductive oxide of Example 3.
Figure 3:
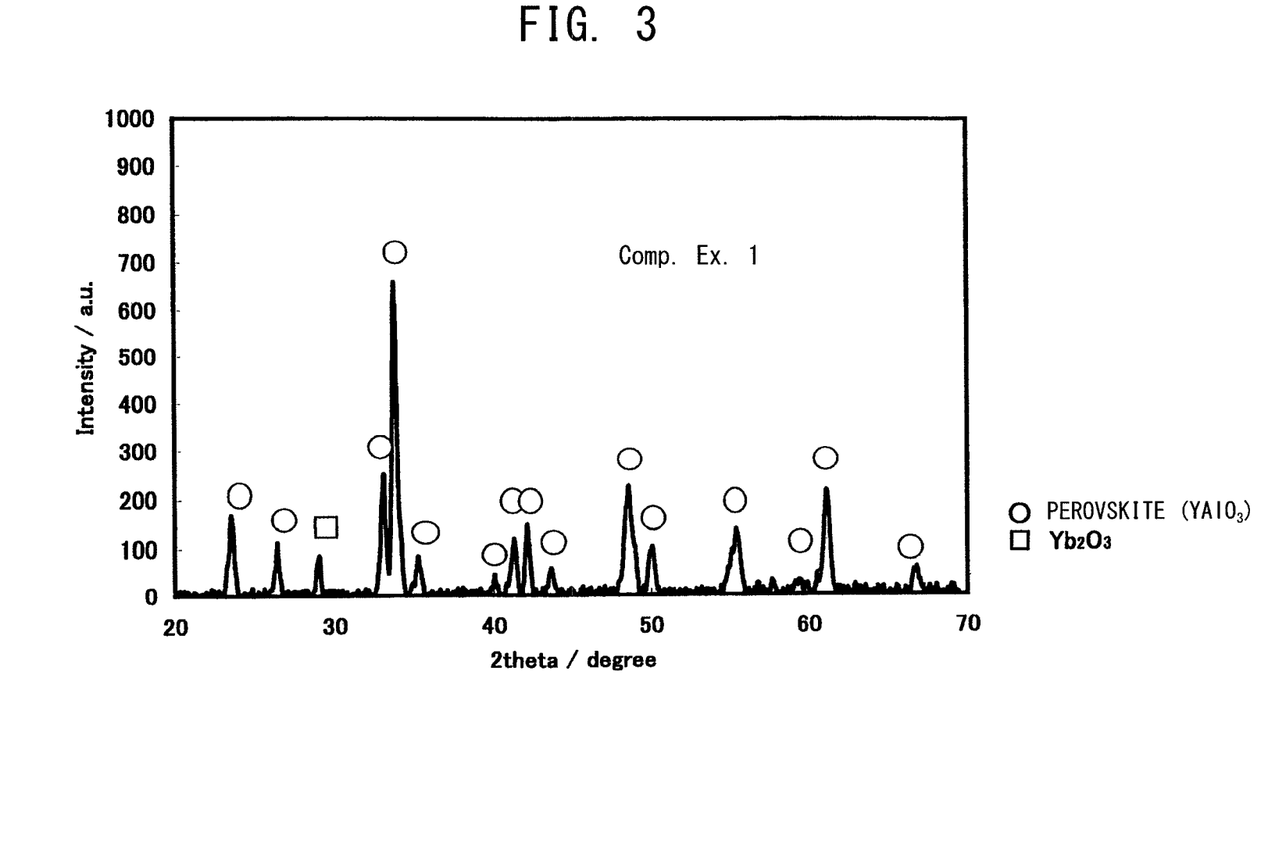
[FIG. 3] Chart showing the X-ray diffraction analysis of the sintered electroconductive oxide of Comparative Example 1.
Figure 4:
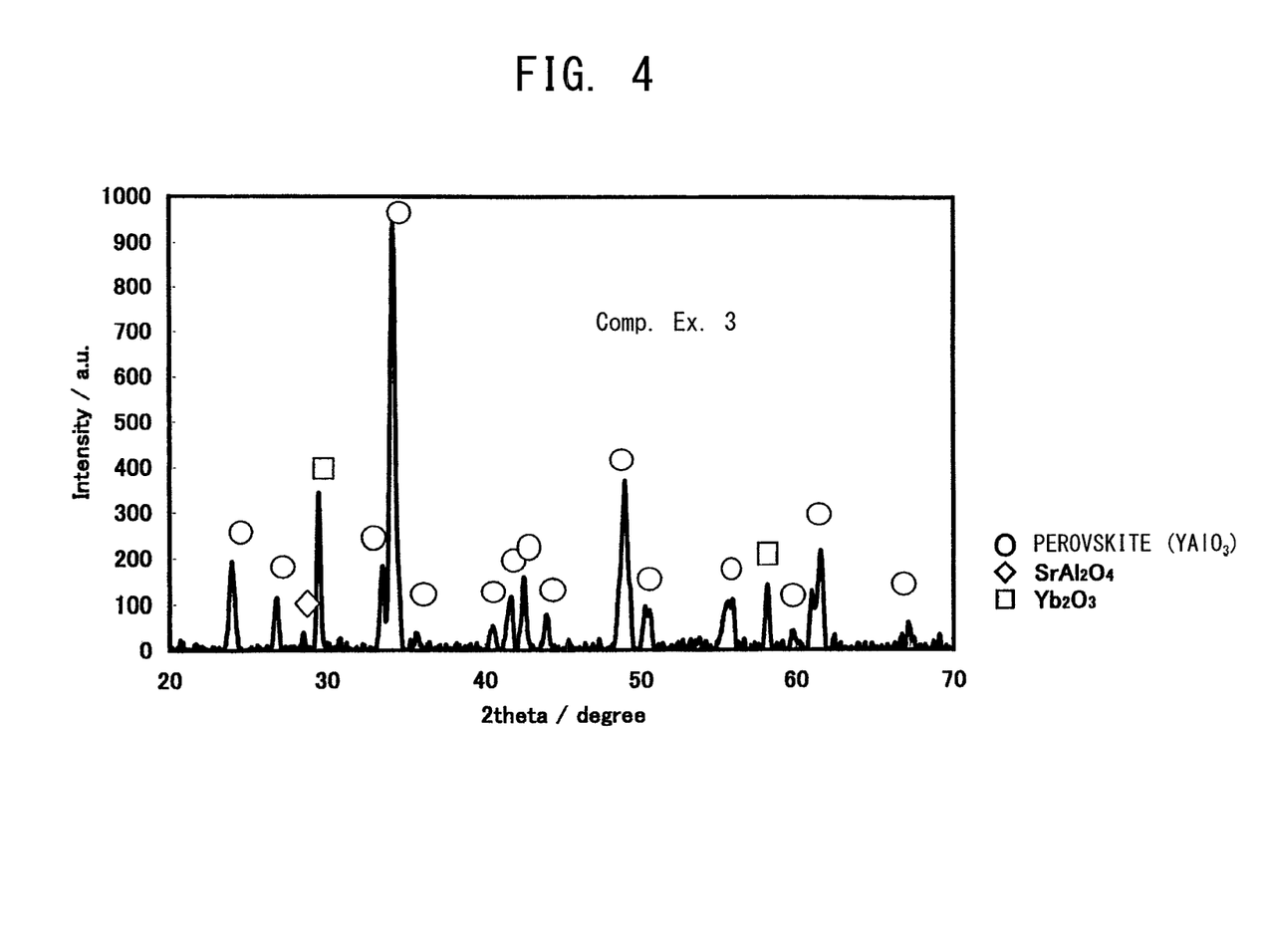
[FIG. 4] Chart showing the X-ray diffraction analysis of the sintered electroconductive oxide of Comparative Example 3.

In Examples 2 and 3, a crystal phase (first crystal phase) having a crystal structure of RE4Al$_2$O$_9$ is confirmed by the peaks denoted by "inverted triangle." Also in this case, the crystal structure type was assumed to Y$_4$Al$_2$O$_9$, and the presence of peaks corresponding to the peak data of Y$_4$Al$_2$O$_9$ was confirmed. The crystal structure type was identified through the above procedure, and then the fact that the first crystal phase contains Y and Yb was confirmed through EPMA/WDS. Thus, the first phase of the samples of Examples 2 and 3 was identified as (Y,Yb)$_4$Al$_2$O$_9$.

In Examples 2 and 3 and Comparative Example 3, the presence of SrAl$_2$O$_4$ was identified by the peaks denoted by "diamond." In Examples 2 and 3 and Comparative Examples 1 and 3, the presence of Yb$_2$O$_3$ was identified by the peak denoted by "square."

The crystal phases of the samples of other Examples and Comparative Examples were also identified through the same procedure.

Through the X-ray analysis, a second crystal phase: ((Y,Yb)$_{1-a}$Sr$_a$)(Al,Mn,Cr)O$_3$ denoted by "O" and a first crystal phase: (Y,Yb)$_4$Al$_2$O$_9$ denoted by "inverted triangle" were found to be formed in Examples 2 and 3 (see FIGS. 1 and 2). In contrast, in Comparative Examples 1 and 3 (see FIGS. 3 and 4), the second crystal phase: ((Y,Yb)$_{1-a}$Sr$_a$)(Al,Mn,Cr)O$_3$ denoted by "O" was formed, but no peak attributed to formation of the first crystal phase: (Y,Yb)$_4$Al$_2$O$_9$ denoted by "inverted triangle" was found.

The above results are the same in other Examples and Comparative Examples.

In Example 6, (Y,Lu)$_4$Al$_2$O$_9$ was formed as the first crystal phase, and ((Y,Lu)$_{1-a}$Sr$_a$)(Al,Mn,Cr)O$_3$ was formed as the second crystal phase.

In Example 7, (Y,Yb,Lu)$_4$Al$_2$O$_9$ was formed as the first crystal phase, and ((Y,Yb,Lu)$_{1-a}$Sr$_a$)(Al,Mn,Cr)O$_3$ was formed as the second crystal phase.

In Example 12, (Nd,Yb)$_4$Al$_2$O$_9$ was formed as the first crystal phase, and ((Nd,Yb)$_{1-a}$Sr$_a$)(Al,Mn,Cr)O$_3$ was formed as the second crystal phase.

In Example 13, (Nd,Yb)$_4$Al$_2$O$_9$ was formed as the first crystal phase, and ((Nd,Yb)$_{1-a}$Sr$_a$)(Al,Fe,Cr)O$_3$ was formed as the second crystal phase.

In Example 14, (Y,Yb)$_4$Al$_2$O$_9$ was formed as the first crystal phase, and ((Y,Yb)$_{1-a}$Sr$_a$)(Al,Mn,Cr)O$_3$ was formed as the second crystal phase.

In Example 15, (Y,Yb)$_4$Al$_2$O$_9$ was formed as the first crystal phase, and ((Y,Yb)$_{1-a}$(Sr,Mg)$_a$)(Al,Mn,Cr)O$_3$ was formed as the second crystal phase.

In Comparative Example 2, (Y$_{1-a}$Sr$_a$)(Al,Mn,Cr)O$_3$ was formed as the second crystal phase.

In Comparative Example 5, ((Y,Yb)$_{1-a}$(Sr,Ca)$_a$)(Al,Mn,Cr)O$_3$ was formed as the second crystal phase.

In Example 6, ((Y,Yb)$_{1-a}$(Sr,Mg)$_a$)(Al,Mn,Cr)O$_3$ was formed as the second crystal phase.

In all Comparative Examples, no first crystal phase was formed.

Thus, the difference in characteristics between Examples and Comparative Examples is mainly due to formation of the first crystal phase (denoted by "inverted triangle"): (Y,Yb)$_4$Al$_2$O$_9$ or the like.

SrAl$_2$O$_4$ denoted by "diamond" is present in Comparative Example 3, and Yb$_2$O$_3$ denoted by "square" is present in Comparative Examples 1 and 3. Thus, the presence of these phases do not necessarily determine the characteristics of the sintered compacts of the Examples.

(Production of Thermistor Element)

Figure 5:
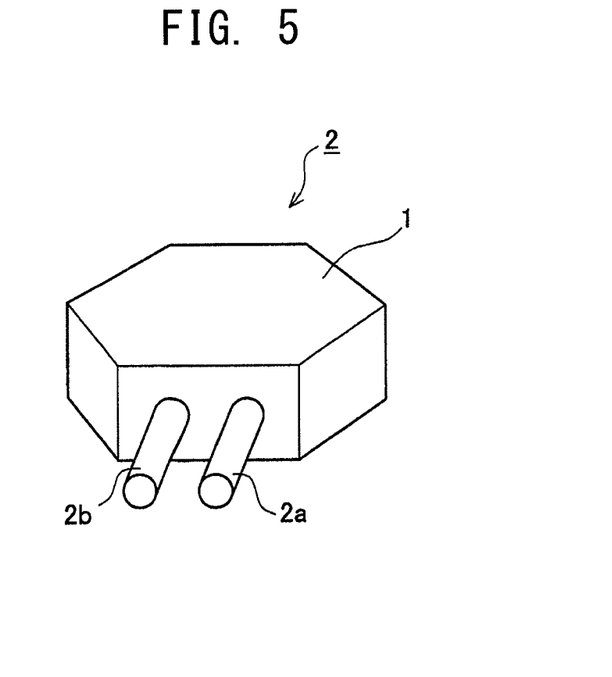
[FIG. 5] Sketch of the thermistor element according to Examples 1 to 15.

The aforementioned granulated powder was subjected to die press molding (pressure: 440 MPa=4,500 kg/cm$^2$), to thereby form a green compact of hexagonal plate shape (1.24 mm in thickness) with an electrode wire pair 2a, 2b made of Pt—Rh alloy embedded at one end thereof in the green compact as shown in FIG. 5. The green compact was then fired at 1550° C. for 4 hours in air, thereby providing a thermistor element 2 according to each of Examples 1 to 6 and 7 to 15. Thermistor elements according to Comparative Examples 1, 2, and 4 to 6 were produced in a manner similar to the above. The thermistor element according to Comparative Example 3 was produced in the same procedure as employed in Example 3, except that the firing temperature was adjusted to 1,450° C.

The thermistor element 2 had a hexagonal shape with a side length of 1.15 mm, a thickness of 1.00 mm, a diameter φ of the electrode wires 2a and 2b of 0.3 mm, an electrode center distance of 0.74 mm (a gap of 0.44 mm), and an electrode insertion length of 1.10 mm.

Figure 6:
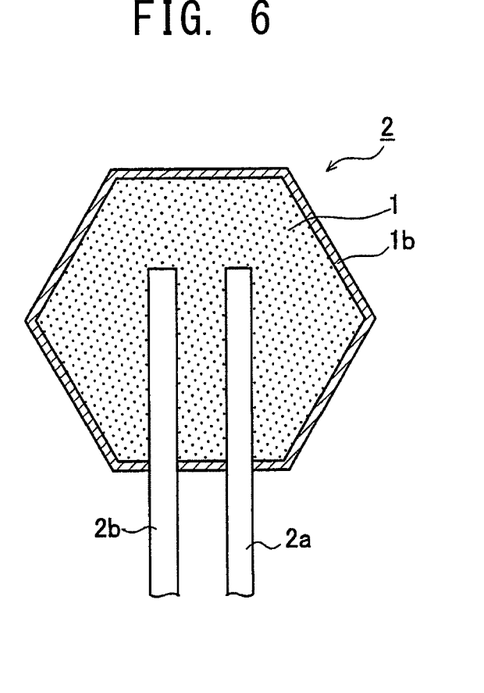
[FIG. 6] Partially sectional view of the thermistor element according to Example 16.

The thermistor element of Example 16 was fabricated through the following procedure. Specifically, a commercial glass powder was kneaded with a binder and a dispersion medium, to thereby prepare a slurry for dip coating, and the sintered compact of Example 3 was immersed in the slurry. The compact was drawn from the slurry and dried, to thereby form a coating film on the surface of the sintered compact. Then, the coated compact was fired at a predetermined temperature, to thereby densify the coating film. The structure of the thus-produced thermistor element 2 is shown in FIG. 6. As shown in FIG. 6, the thermistor element 2 of Example 16 has a sintered compact 1 and a reduction-resistant glass coating film 1b which densely covers the surface of the sintered compact.

The B constant (temperature gradient constant) of each thermistor 2 (according to Examples 1 to 16 and Comparative Examples 1 to 6) was determined through the following procedure. Specifically, the thermistor element 2 was allowed to stand at 233 K (=−40° C.) (T(−40) condition), and the initial resistance (R(−40)) was measured under the T(−40) condition. Subsequently, the thermistor element 2 was allowed to stand at 873 K (=600° C.) (T(600) condition), and the initial resistance (R(600)) was measured under the T(600) condition. Then, the B constant (B(−40 to 600)) was calculated by the following equation (1):

$$B(-40 \text{ to } 600) = \ln[R(600)/R(-40)]/[1/T(600) - 1/T(-40)] \quad (1),$$

wherein R(−40) represents the resistance (kΩ) of the thermistor element at −40° C., and R(600) represents the resistance (kΩ) of the thermistor element at 600° C.

Table 3 shows the results of the measurements of R(−40), R(600), and B(−40 to 600) determined in the Examples.

TABLE 3

| | Factor a | R (−40) kΩ | R (600) kΩ | B (−40-600) K |
|---|---|---|---|---|
| Ex. 1 | 0.21 | 23.95 | 0.0452 | 1,993 |
| Ex. 2 | 0.29 | 9.74 | 0.0257 | 1,887 |
| Ex. 3 | 0.28 | 8.92 | 0.0250 | 1,868 |
| Ex. 4 | 0.28 | 11.15 | 0.0267 | 1,918 |
| Ex. 5 | 0.28 | 13.17 | 0.0391 | 1,850 |
| Ex. 6 | 0.28 | 8.76 | 0.0274 | 1,834 |
| Ex. 7 | 0.28 | 8.29 | 0.0261 | 1,831 |
| Ex. 8 | 0.19 | 35.10 | 0.0727 | 1,964 |
| Ex. 9 | 0.24 | 28.86 | 0.0748 | 1,893 |
| Ex. 10 | 0.35 | 8.06 | 0.0246 | 1,841 |
| Ex. 11 | 0.42 | 5.06 | 0.0168 | 1,815 |
| Ex. 12 | 0.20 | 6.62 | 0.0137 | 1,964 |
| Ex. 13 | 0.24 | 16.98 | 0.0386 | 1,934 |
| Ex. 14 | 0.29 | 12.74 | 0.0277 | 1,949 |
| Ex. 15 | 0.29 | 15.84 | 0.0346 | 1,947 |
| Ex. 16 | 0.28 | 8.61 | 0.0249 | 1,858 |
| Comp. Ex. 1 | 0.15 | 1,165 | 0.1843 | 2,781 |
| Comp. Ex. 2 | 0.11 | 847 | 0.0828 | 2,935 |
| Comp. Ex. 3 | 0.10 | 620 | 0.0891 | 2,812 |
| Comp. Ex. 4 | 0.18 | 21.53 | 0.0277 | 2,116 |
| Comp. Ex. 5 | 0.15 | O.R. | 0.4054 | — |
| Comp. Ex. 6 | 0.10 | 7,313 | 0.2563 | 3,261 |

As is clear from Table 3, the thermistor elements 2 having parts formed of the sintered compact of Examples 1 to 16 exhibited a B constant (B(−40 to 600)) of 2,000 K or lower. In contrast, the thermistor elements employing the sintered compact of Comparative Examples 1 to 6 exhibited a B constant higher than 2,000 K.

The thermistor element 2 of Example 16 having a reduction-resistant coating film 1b exhibited a B constant of 1,858 K, and the thermistor element 2 of Example having the same composition but no coating film exhibited a B constant of 1,868 K. Since the two B constants are almost equal to each other, the presence of the reduction-resistant coating film 1b has virtually no effect on the B constant.

In Table 3, the value "O.R." of Comparative Example 5 refers to "over range," which means that R(600) exceeded the measurable range of the measuring apparatus.

As is clear from Tables 2 and 3, the sintered electroconductive oxides and the thermistor elements according to Examples 1 to 16 contain a first crystal phase represented by $RE1_4Al_2O_9$, wherein RE1 represents a first element group consisting of at least one of Yb and Lu and at least one species selected from among group 3A elements (group 3 elements) excluding Yb, Lu, and La. Specific examples of the first element group RE1 in the Examples include Y—Yb, Y—Lu, Y—Yb—Lu, and Nd—Yb. The sintered electroconductive oxides and the thermistor elements also contain a second crystal phase having a perovskite structure ($ABO_3$) represented by $(RE2_{1-a}SL_a)MO_3$, wherein RE2 represents a second element group which contains at least one species selected from among group 3A elements (group 3 elements) excluding La and which contains at least one species selected from the first element group RE1; M1 represents an element group consisting of at least one species selected from among group 4A, 5A, 6A, 7A, and 8 elements (group 4 to group 10 elements); and M represents an element group consisting of the element group M1 and Al; and SL represents an element group consisting of Sr, Ca, and Mg, with at least Sr being included at a predominant proportion by mole.

In each case, the factor a of the second crystal phase satisfies the following condition: 0.18<a<0.50.

Specific examples of the second element group RE2 in the Examples 1 to 16 include Y—Yb, Y—Lu, Y—Yb—Lu, and Nd—Yb. Specific examples of the element group M1 include Mn, Fe, and Cr.

In Comparative Examples 5 and 6, the element group SL contains Ca or Mg in an amount equivalent to that of Sr; i.e., Sr is not a predominant component, and the B constant is very high. Therefore, the element group SL preferably contains, among Sr, Ca, and Mg, at least Sr at a predominant proportion by mole.

Particularly, in Examples 1 to 16, the second crystal phase has a factor a falling within a range of $0.19 \leq a \leq 0.42$. Under the conditions, a B constant (B(−40 to 600)) of 2,000 K or less can be ensured in the presence of the first crystal phase and the second crystal phase. The lower limit of the factor a is preferably adjusted to $a \geq 0.24$. Under the conditions, the B constant (B(−40 to 600)) can be lowered to 1,950 K or lower.

In Example 14, the element group SL contains Sr and 10% of Ca (Sr:Ca=9:1). In Example 15, the element group SL predominantly contains Sr and 10% of Mg (Sr:Mg=9:1). Through incorporation of Ca or Mg, the B constant can be lowered to 2,000 K or less.

However, the thermistor elements 2 (sintered compacts) of Examples 1 to 13 and 16, in which the element group SL is only Sr, are preferred, since the B constant can be lowered as compared with those in which the element group SL contains Ca or Mg (in the A site of the second crystal phase).

The element group M1, which forms solid solution with (is substituted by) Al in the B site of the second crystal phase is preferably Cr and Mn (Examples excepting Examples 13) or Fe (Example 13).

In the B site of the second crystal phase, when Mn or Fe is employed as the element group M1, which forms solid solution with Al, the produced sintered oxide and the thermistor element having a part formed of the oxide reliably exhibit appropriate electrical properties (e.g., B constant and resistance) in a wide temperature range, which is advantageous. Use of Cr readily provides the sintered oxide and the thermistor element with reliable electrical properties, which is also advantageous.

Particularly preferably, the element group M1 contains at least Mn and Cr.

In the B site of the second crystal phase, when Mn and Cr are employed as the element group M1, which forms solid solution with (is substituted by) Al, the produced sintered oxide and the thermistor element having a part formed of the oxide reliably exhibit appropriate electrical properties, which is advantageous.

Furthermore, in the thermistor elements 2 (sintered compacts) of Examples 1 to 16, the second crystal phase is represented by $(RE2_{1-a}SL_a)(Al_xM1_w)O_3$, wherein the element group M1 has factors x and w satisfying the following relationships:

$0.40 \leq x \leq 0.90;$ $0.05 \leq w \leq 0.65;$ and $0.90 \leq x+w \leq 1.1.$

Thus, in the second crystal phase having a perovskite structure (ABO$_3$ structure), the B-site contains Al and the element group M. In the B site, factors x and w, which represent the ratio by mole of Al and the element group M1, are adjusted to the aforementioned relationships. Through incorporation of the element group M1 into the B site, the perovskite-structure second crystal phase can be readily formed and maintained, whereby the produced sintered oxide reliably serves as a conductor.

In the thermistor elements 2 (sintered compacts) of Examples 1 to 16 excepting Example 13, the element group M1 contains Mn and Cr, and the second crystal phase is represented by $(RE2_{1-a}SL_a)(Al_xMn_yCr_z)O_3$, wherein the factors x, y, and z satisfy the following relationships:

$0.40 \leq x \leq 0.90;$ $0.05 \leq y \leq 0.60;$ $0 < z \leq 0.05;$ and $0.90 \leq x+y+z \leq 1.1.$ In the sintered electroconductive oxides, the second crystal phase having a perovskite structure (ABO$_3$ structure) contains a B-site element group M including Al, Mn, and Cr. In the B site, factors x, y, and z, which represent the proportions by mole of these elements, are adjusted to the aforementioned relationships. Since the ionic radii of the elements Al, Mn, and Cr included in the B site are almost same, these elements are readily replaceable. Therefore, formation of by-products of these element is prevented, and the produced oxide has a stable substitution proportions. By virtue of this property, the temperature gradient constant (B constant) of the sintered electroconductive oxide can be modified through changing the compositional proportions as desired in a wide range.

The thermistor elements 2 having parts formed of the sintered electroconductive oxides 1 having compositions of Examples 1 to 16 excepting Example 13 exhibited a B constant (B(−40 to 600) of 2,000 K or lower (more specifically, 1,800 to 2,000 K), which are relatively lower than conventionally attained B constant values. Thus, thermistor elements 2 having parts formed of the sintered electroconductive oxides 1 according to Examples 1 to 16 having such B constants have appropriate electrical resistance values in a wide temperature range from −40° C. to 600° C., leading to correct temperature measurement.

As is clear from Tables 2 and 3, the sintered electroconductive oxides and the thermistor elements according to Examples 1 to 6, and 7 to 16 contain a first crystal phase represented by $RE1_4Al_2O_9$, wherein RE1 represents a first element group consisting of at least one of Yb and Lu and at least one species selected from among group 3A elements (group 3 elements) excluding Yb, Lu, and La. Specific examples of the first element group RE1 in the Examples include Y—Yb, Y—Lu, Y—Yb—Lu, and Nd—Yb.

The sintered electroconductive oxides and the thermistor elements also contain a second crystal phase having a perovskite structure (ABO$_3$) represented by $(RE2_{1-a}Sr_a)MO_3$, wherein RE2 represents a second element group which contains at least one species selected from among group 3A elements (group 3 elements) excluding La and which contains at least one species selected from the first element group RE1; and M represents an element group consisting of Al and at least one species selected from group 4A, 5A, 6A, 7A, and 8 elements (group 4 to group 10 elements). In each case, the factor a of the second crystal phase satisfies the following condition: $0.18 < a < 0.50$.

Specific examples of the second element group RE2 in the Examples include Y—Yb, Y—Lu, Y—Yb—Lu, and Nd—Yb. Specific examples of the element group M include Al, Mn, Fe, and Cr.

In Examples 1 to 6 and Examples 7 to 12, the element group M in the second crystal phase contains Al, Mn, and Cr, and the second crystal phase is represented by $(RE2_{1-a}Sr_a)(Al_xMn_yCr_z)O_3$, wherein the factors x, y, and z satisfy the following relationships:

$0.40 \leq x \leq 0.90;$ $0.05 \leq y \leq 0.60;$ $0 < z \leq 0.05;$ and $0.90 \leq x+y+z \leq 1.1.$ The thermistor elements 2 having parts formed of the sintered electroconductive oxides 1 having compositions of Examples 1 to 6, and 7 to 12 exhibited a B constant (B(−40 to 600) of 2,000 K or lower (more specifically, 1,800 to 2,000

K), which are relatively lower than conventionally attained B constant values. Thus, thermistor elements 2 having parts formed of the sintered electroconductive oxides 1 of Examples 1 to 6, and 7 to 12, each having such a B constant, have appropriate electrical resistance values in a wide temperature range from −40° C. to 600° C., leading to correct temperature measurement.

In contrast, in Comparative Examples 1 to 3, B constant (B(−40 to 600)) was 2,500 K or higher.

In Comparative Example 1, the composition contains Y, Yb, and Al (see Comparative Example 1 in Table 1). However, a first crystal phase ((Y,Yb)$_4$Al$_2$O$_9$) was not formed (see FIG. 3), and the factor a was 0.15 (i.e., ≤0.18, falling outside the range of 0.18<a<0.50).

In Comparative Example 2, the composition contains Y and Al (see Comparative Example 2 in Table 1). However, formation of a first crystal phase or a similar phase (Y$_4$Al$_2$O$_9$) was not confirmed, and the factor a was 0.11 (i.e., ≤0.18, falling outside the range of 0.18<a<0.50).

In Comparative Example 3, no first crystal phase was formed (see FIG. 4), and the factor a was 0.10 (i.e., ≤0.18, falling outside the range of 0.18<a<0.50).

In Comparative Examples 1 to 3, the B constant was thought to be greater due to the characteristics differing from those obtained in the Examples.

In Comparative Example 4, since the factor a was adjusted 0.17, a B constant (B(−40 to 600)) of 2,116 K was obtained. Therefore, in order to attain a B constant (B(−40 to 600) of <2,000 K, the factor a is adjusted to be a>0.18.

As described above, when the aforementioned first crystal phase is present, and the factor a of the second crystal phase falls within the aforementioned range (0.18<a<0.50) (i.e., Examples 1 to 16), the B constant can be lowered to 2,000 K or less.

Particularly, in Comparative Example 3, only the firing temperature was changed from that employed in Example 3.

Therefore, a first crystal phase, for example (Y,Yb)$_4$Al$_2$O$_9$, can be specifically formed through controlling the firing temperature.

Figure 7:
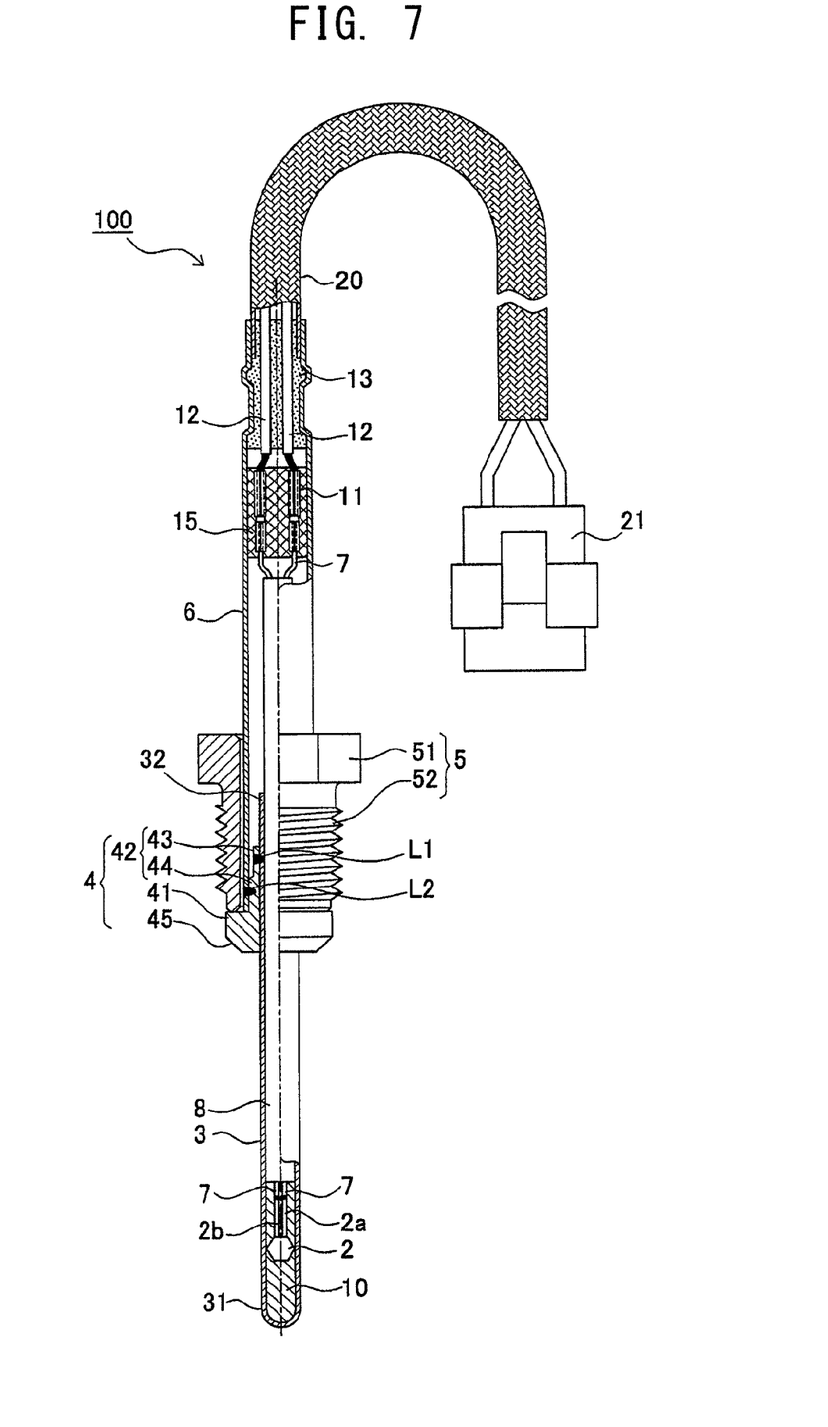
[FIG. 7] Partially sectional view of a temperature sensor employing the thermistor element of FIG. 5.

With reference to FIG. 7, there will next be described the configuration of a temperature sensor 100 employing the thermistor element 2 of the present invention. The temperature sensor 100 employs the thermistor element 2 as a temperature-sensing element. The temperature sensor 100 is mounted to a sensor mount portion of an automobile exhaust pipe in such a manner that the thermistor element 2 is located in the exhaust pipe where the exhaust gas flows, so as to detect the temperature of the exhaust gas.

In the temperature sensor 100, a metal tube 3 is formed into a bottomed cylindrical shape along the direction of a sensor axis (hereinafter also referred to as "axial direction") and has a closed front end portion 31 (on the bottom side in FIG. 7) in which the thermistor element 2 of the invention is installed. The metal tube 3 has been subjected to thermal treatment in advance, and the outer side and inner side thereof are coated with oxide film. Cement 10 is charged into the metal tube 3 around the thermistor element 2 so as to fix the thermistor element 2 in position. A rear end 32 of the metal tube 3 is open and inserted into a flange member 4 through press fitting.

The flange member 4 includes a cylindrical shell 42 extending in the axial direction and a flange 41 located on the front side (bottom side in FIG. 7) of the shell 42 and having a larger outer diameter than that of the shell 42, to protrude radially outwardly from the shell 42. The flange member 4 also includes a tapered seat surface 45 formed on a front end of the flange 41 to seal the mount portion of the exhaust pipe.

The shell 42 has a two-step shape with a front shell portion 44 and a smaller-diameter rear shell portion 43.

The metal tube 3 is securely held in the flange member 4 by press-fitting the metal tube 3 into the flange member 4 and laser-welding the outer surface of the metal tube 3 at a location L1 throughout its circumference to the rear shell portion 43 of the flange member 4. Further, a metal cover member 6 is airtightly joined to the front shell portion 44 of the flange member 4 by press-fitting the metal cover member 6 into the front shell portion 44 of the flange member 4 and laser-welding the metal cover member 6 at a location L2 throughout its circumference to the front shell portion 44 of the flange member 4.

An attachment member 5 having a hexagonal nut 51 and a screw 52 is rotatably engaged around the flange member 4 and the metal cover member 6. The temperature sensor 100 of the present embodiment is mounted on the exhaust pipe (not shown) by bringing the seat surface 45 of the flange 41 of the flange member 4 into contact with the mount portion of the exhaust pipe and screwing the nut 51 onto the mount portion.

A sheath member 8 is disposed in the metal tube 3, the flange member 4, and the metal cover member 6. The sheath member 8 has a metallic outer casing, a pair of conductive core wires 7 installed in the outer casing, and an insulating powder material charged into the outer casing in such a manner as to establish electrical insulation between the outer casing and the core wires 7 and to hold the core wires 7 in position. The sheath member 8 has been thermally treated in advance, to thereby form oxide coating film thereon. The electrode wires 2a and 2b of the thermistor element 2 are connected through laser welding to the respective end portions of the core wires 7 protruding from the front end of the outer casing of the sheath member 8 (downward in the drawing) within the metal tube 3.

The respective end portions of the core wires 7 protruding rearward from the sheath member 8 are connected to a pair of lead wires 12 via crimp terminals 11. Insulating tubes 15 are arranged to provide electrical insulation between the core wires 7 and between the crimp terminals 11.

The lead wires 12 pass through lead wire insertion holes of an elastic seal member 13, which is fitted in the rear end portion of the metal cover member 6, extend from the inside to the outside of the metal cover member 6, and are then coupled to terminals of a connector 21 for connection to an external circuit (such as ECU, not shown). With this arrangement, the output of the thermistor element 2 is sent from the core wires 7 of the sheath member 8 to the external circuit through the lead wires 12 and the connector 21 so as to determine the temperature of the exhaust gas. In order to protect the lead wires 12 from external force, such as scattering stones, the lead wires 12 are covered with a glass braided tube 20. The glass braided tube 20 is crimped at a front end thereof into the metal cover member 6 together with the elastic seal member 13.

Since the temperature sensor 100 having the above structure employs the thermistor element 2 made of the aforementioned sintered electroconductive oxide 1, the temperature of an exhaust gas of an automotive engine can be correctly measured in a wide temperature range of −40° C. to 600° C.

If an appropriate pull-up resistance is employed in a detection circuit in the temperature sensor 100, in the case where a voltage of 5 V is applied to the temperature sensor 100, the output thereof can be regulated to fall within a range of 4.8 V to 0.2 V at −40° C. to +600° C. Thus, even in the case where the output is input to a circuit having a maximum input voltage of 5 V, temperature sensing can be performed correctly. In addition, since the temperature sensor 100 (thermistor element 2) can output about 4.8 V at a low temperature (−40° C.), which is lower than 5.0 V, wire breakage can be detected correctly in a simple manner. Similarly, since the temperature sensor can output about 0.2 V at a high temperature (+600° C.), which is higher than 0 V, short circuit can be detected correctly in a simple manner.

Although the present invention has been described with reference to the above Examples, the invention is not limited to the these Examples. Those skilled in the art can conceive various modifications and variations thereof without deviating the scope of the invention.

In the production of the sintered electroconductive oxide (thermistor element), the powders of the compounds of the respective constituent elements as indicated in the Examples may be used as raw powders. Other compounds such as oxides, carbonates, hydroxides, and nitrates may also be used. Among them, an oxide or a carbonate is preferably used.

The sintered electroconductive oxide may contain any other component such as Na, K, Ga, Si, C, Cl, or S, so long as the characteristics required for the sintered electroconductive oxide, the thermistor element, or the temperature sensor, such as sinterability, B constant, and temperature characteristics (durability at high temperature) are not impaired.

Description of the Reference Numerals

1 sintered electroconductive oxide
1B reduction-resistant coating film
2 thermistor element
2A,2B electrode wire
100 temperature sensor

The invention claimed is:

1. A sintered electroconductive oxide characterized in that the oxide has a first crystal phase having a composition represented by $RE1_4Al_2O_9$ and a second crystal phase having a perovskite structure represented by $(RE2_{1-a}SL_a)MO_3$, and that the factor a of the second crystal phase satisfies the following condition: $0.18 < a < 0.50$,
wherein RE1 represents a first element group consisting of at least one of Yb and Lu and at least one species selected from among group 3A elements excluding Yb, Lu, and La;
RE2 represents a second element group which contains at least one species selected from among group 3A elements excluding La and which contains at least one species selected from the first element group RE1;
M1 represents an element group consisting of at least one species selected from group 4A, 5A, 6A, 7A, and 8 elements; and
M represents an element group consisting of the element group M1 and Al; and
SL represents an element group consisting of Sr, Ca, and Mg, with at least Sr being included at a predominant proportion by mole;
wherein the sintered electroconductive oxide has a B constant of less than 2,000 K, within a temperature range of from −40° C. to +600° C.

2. A sintered electroconductive oxide according to claim 1, wherein the element group SL consists of Sr.

3. A sintered electroconductive oxide according to claim 1, wherein the element group M1 contains Cr and at least one of Mn and Fe.

4. A sintered electroconductive oxide according to claim 1, wherein the element group M1 contains at least Mn and Cr.

5. A sintered electroconductive oxide according to claim 1, wherein the second crystal phase is represented by $(RE2_{1-a}SL_a)(Al_xM1_w)O_3$, wherein the factors x and w satisfy the following relationships:

$0.40 \leq x \leq 0.90$;

$0.05 \leq w \leq 0.65$; and $0.90 \leq x+w \leq 1.1$.

6. A sintered electroconductive oxide according to claim 1, wherein the element group M1 contains Mn and Cr, and the second crystal phase is represented by $(RE2_{1-a}SL_a)(Al_xMn_yCr_z)O_3$, wherein the factors x, y, and z satisfy the following relationships:

$0.40 \leq x \leq 0.90$;

$0.05 \leq y \leq 0.60$;

$0 < z \leq 0.05$; and $0.90 \leq x+y+z \leq 1.1$.

7. A thermistor element having a part formed of a sintered electroconductive oxide as recited in claim 1, and a reduction-resistant coating film which covers the part formed of the sintered electroconductive oxide.

8. A thermistor element having a part formed of a sintered electroconductive oxide as recited in claim 1.

9. A temperature sensor having a thermistor element as recited in claim 8.

10. A sintered electroconductive oxide characterized in that
the oxide has a first crystal phase having a composition represented by $RE1_4Al_2O_9$ and a second crystal phase having a perovskite structure represented by $(RE2_{1-a}Sr_a)MO_3$, and the factor a of the second crystal phase satisfies the following condition: $0.18 < a < 0.50$,
wherein RE1 represents a first element group consisting of at least one of Yb and Lu and at least one species selected from among group 3A elements excluding Yb, Lu, and La;
RE2 represents a second element group which contains at least one species selected from among group 3A elements excluding La and which contains at least one species selected from the first element group RE1; and
M represents an element group consisting of Al and at least one species selected from among group 4A, 5A, 6A, 7A, and 8 elements,
wherein the sintered electroconductive oxide has a B constant of less than 2,000 K, within a temperature range of from −40° C. to +600° C.

11. A sintered electroconductive oxide according to claim 10, wherein the element group M contains Al, Mn, and Cr, and the second crystal phase is represented by $(RE2_{1-a}Sr_a)(Al_xMn_yCr_z)O_3$, wherein the factors x, y, and z satisfy the following relationships:

$0.40 \leq x \leq 0.90$;

$0.05 \leq y \leq 0.60$;

$0 < z \leq 0.05$; and $0.90 \leq x+y+z \leq 1.1$.

12. A thermistor element having a part formed of a sintered electroconductive oxide characterized in that
the oxide has a first crystal phase having a composition represented by $RE1_4Al_2O_9$ and a second crystal phase having a perovskite structure represented by $(RE2_{1-a}SL_a)MO_3$, and that the factor a of the second crystal phase satisfies the following condition: $0.18<a<0.50$, wherein RE1 represents a first element group consisting of at least one of Yb and Lu and at least one species selected from among group 3A elements excluding Yb, Lu, and La;

RE2 represents a second element group which contains at least one species selected from among group 3A elements excluding La and which contains at least one species selected from the first element group RE1;

M1 represents an element group consisting of at least one species selected from group 4A, 5A, 6A, 7A, and 8 elements; and M represents an element group consisting of the element group M1 and Al; and SL represents an element group consisting of Sr, Ca, and Mg, with at least Sr being included at a predominant proportion by mole.

13. A temperature sensor having a thermistor element as recited in claim 12.

* * * * *